(12) United States Patent
DaCunha et al.

(10) Patent No.: US 8,256,760 B2
(45) Date of Patent: Sep. 4, 2012

(54) SYSTEM FOR CONTROLLING A DRIVE BELT IN A MAILPIECE FEEDER

(75) Inventors: Steven J. DaCunha, West Hartford, CT (US); Richard F. Stengl, Watertown, CT (US); Boris Rozenfeld, New Milford, CT (US); Anthony E. Yap, Danbury, CT (US)

(73) Assignee: Pitney Bowes Inc., Stamford, CT (US)

( * ) Notice: Subject to any disclaimer, the term of this patent is extended or adjusted under 35 U.S.C. 154(b) by 49 days.

(21) Appl. No.: 12/880,647

(22) Filed: Sep. 13, 2010

(65) Prior Publication Data
US 2012/0061205 A1 Mar. 15, 2012

(51) Int. Cl.
*B65H 85/00* (2006.01)
(52) U.S. Cl. ...... 271/3.21; 271/3.2; 271/4.02; 271/4.03; 271/4.05; 271/4.06; 271/7; 271/10.07; 271/270
(58) Field of Classification Search .................. 271/3.15, 271/3.18, 3.21, 3.2, 3.24, 4.01–4.03, 4.05, 271/4.06, 6, 7, 10.02, 10.03, 10.06, 10.07, 271/34, 35, 110, 111, 265.02, 270
See application file for complete search history.

(56) References Cited

U.S. PATENT DOCUMENTS

| | | | | |
|---|---|---|---|---|
| 6,170,816 B1 * | 1/2001 | Gillmann et al. | .......... | 271/10.03 |
| 6,644,659 B2 * | 11/2003 | Skadow et al. | .......... | 271/265.02 |

* cited by examiner

*Primary Examiner* — Michael McCullough
(74) *Attorney, Agent, or Firm* — Brian A. Collins; Charles R. Malandra, Jr.; Steven J. Shapiro

(57) ABSTRACT

A system for conveying mailpieces along a feed path including first and second conveyances. A first conveyance is operative to convey mailpieces along the feed path and includes a singulating and drive belt. The singulating and drive belts define a throat or singulating a mailpiece from the stack of mailpieces. A second conveyance accepts mailpieces from the first conveyance and conveys singulated mailpiece downstream of the first conveyance. The system further includes a series of sensors extending from the first to the second conveyance for issuing a gap signal indicative of the relative spacing between sequential mailpieces along the feed path. Additionally, the system includes a means to vary the velocity of the drive belt based upon the location of the gap signal along the series of sensors.

7 Claims, 4 Drawing Sheets

# SYSTEM FOR CONTROLLING A DRIVE BELT IN A MAILPIECE FEEDER

TECHNICAL FIELD

The present invention relates to mailpiece sorters, and, more particularly, to a mailpiece feeder which reliably singulates mailpieces, reduces wear/maintenance and increases throughput for optimum mailpiece sortation.

BACKGROUND OF THE INVENTION

Mailpiece sorters are commonly employed by high volume producers of mail for the purpose of acquiring postage discounts to lower the cost associated with mail delivery services. Most service providers, such as the United States Postal Service (USPS) provide significant postage discounts for mail which is "presorted" For example, mail which has been sorted to a one level, e.g., a five digit postal code indicative of a particular post office, may receive a greater discount that mail sorted to a lower level, e.g., a three digit postal code indicative of a particular state. Hence, mail service providers include incentives for those who sort/combine mail into trays/ bins which are to be delivered to a common state or post office. It is for this reason that mailpiece sorters, which optically scan the destination address to sort mail, are a cost effective and desirable commodity for producers of mail.

A mailpiece sorter commonly includes a feed module which accepts a stack of mailpieces to be singulated and scanned by various downstream equipment and sorted into containers/bins. More specifically, a single mailpiece is separated from the stack by the feeder module, conveyed along a feed path, scanned by an optical device to read the destination address, and subsequently sorted/diverted into one of a plurality of containers/bins.

To optimize throughput of a sorter, the feed module must consistently and reliably singulate mailpieces from the stack, i.e., avoid "double-feeds", maintain a minimum spacing between mailpieces to optimize throughput, and minimizes wear/maintenance of the module components. While feed modules of the prior art have incrementally improved, there continues to be a need to improve their efficiency and reliability.

In view of the foregoing objectives, a need continues to exist for a feeder module which reliably singulates mailpieces, decreases wear/maintenance and optimizes throughput for high volume sortation.

SUMMARY OF THE INVENTION

A system is provided for conveying mailpieces along a feed path including first and second conveyances. A first conveyance is operative to convey mailpieces along the feed path and includes a singulating and drive belt. The singulating and drive belts define a throat or singulating a mailpiece from the stack of mailpieces. A second conveyance accepts mailpieces from the first conveyance and conveys singulated mailpiece downstream of the first conveyance. The system further includes a series of sensors extending from the first to the second conveyance for issuing a gap signal indicative of the relative spacing between sequential mailpieces along the feed path. Additionally, the system includes a means to vary the velocity of the drive belt based upon the location of the gap signal along the series of sensors.

BRIEF DESCRIPTION OF THE DRAWINGS

The accompanying drawings illustrate presently preferred embodiments of the invention and, together with the general description given above and the detailed description given below serve to explain the principles of the invention. As shown throughout the drawings, like reference numerals designate like or corresponding parts.

DETAILED DESCRIPTION OF THE INVENTION

The present invention relates to a feeder, or conveyance module, for singulating a mailpiece from a stack of mailpieces. While the mailpiece feed system is described in the context of a mailpiece sorter, the feed system may be employed in any mailpiece handling system which singulates mailpieces of various thickness and length. In the context used herein "singulation" means the removal and conveyance of a single mailpiece from a stack of mailpieces.

There are various objectives in connection with the singulation of mailpieces from a stack of mailpieces. It should be appreciated that the stack will contain mailpieces which are thick or heavy due to the number of sheets of content material. Furthermore, mailpieces will also be thin or light due to a fewer number of sheets of content material. Additionally, there will be differences in the coefficient of friction between mailpieces and differences in the friction coefficient between the components with singulate a mailpiece from the stack.

One objective of the present invention is to maintain a constant, relatively small gap, between the trailing edge of one mailpiece and the leading edge of the next mailpiece to optimize throughput. Competing with this objective is another requirement to maintain a sufficiently large gap between mailpieces such that components downstream of the mailpiece feed system may properly divert mailpieces into a sorting container or bin. For example, divert mechanisms downstream of the mailpiece feed system require a certain minimum spacing between mailpieces to intercept and separate mailpieces from a rapidly moving series of mailpieces. Yet another objective is to prevent the double feeding of mailpieces to prevent interruption of the sorting operation. That is, when a double feed occurs mailpieces must be diverted and reinserted into the stack.

More specifically, there are various conditions which impact the ability to optimize throughput while reliably singulating mailpieces. Firstly, it has been discovered that the normal force applied between opposing belts must be regulated to reliably singulate mailpieces, i.e., the torque applied about the axis of the opposing belts or arms thereof of the mailpiece feed system. Secondly, it has also been found that the acceleration of the drive belts affects the static and dynamic coefficient of friction between mailpieces, and/or between a mailpiece and the drive belts of the mailpiece feed system. Finally, it has been discovered that a sensing device disposed along the feed path is useful for detecting when mailpieces are singulated, i.e., a gap signal may be obtained and used to provide critical information regarding the status of singulation. Specifically, the status of singulation means that information may be obtained regarding whether thin or thick mailpieces are being singulated, or whether the mailpieces have a low or high coefficient of friction.

Figure 1:
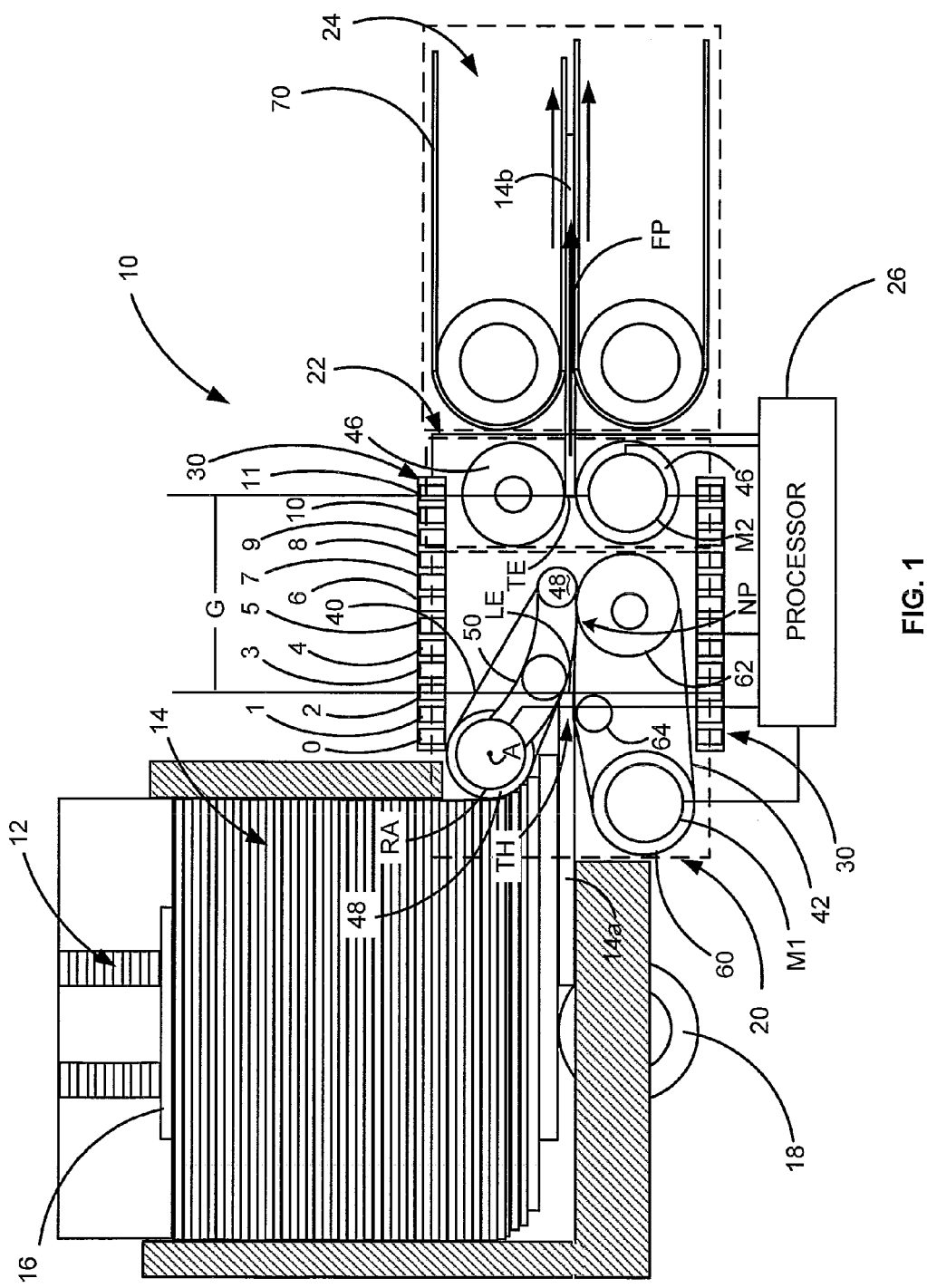
FIG. 1 is a schematic top view of a mailpiece feed system for singulating a mailpiece from a stack of mailpieces according to the present invention, which system includes a plurality of conveyances, an array of sensors extending along a feed path from one to another, and a processor for controlling the conveyances so as to optimize the singulation of mailpieces, reduce the wear and maintenance of the feed system, and optimize throughput of mailpieces traveling along the feed path.
Figure 2:
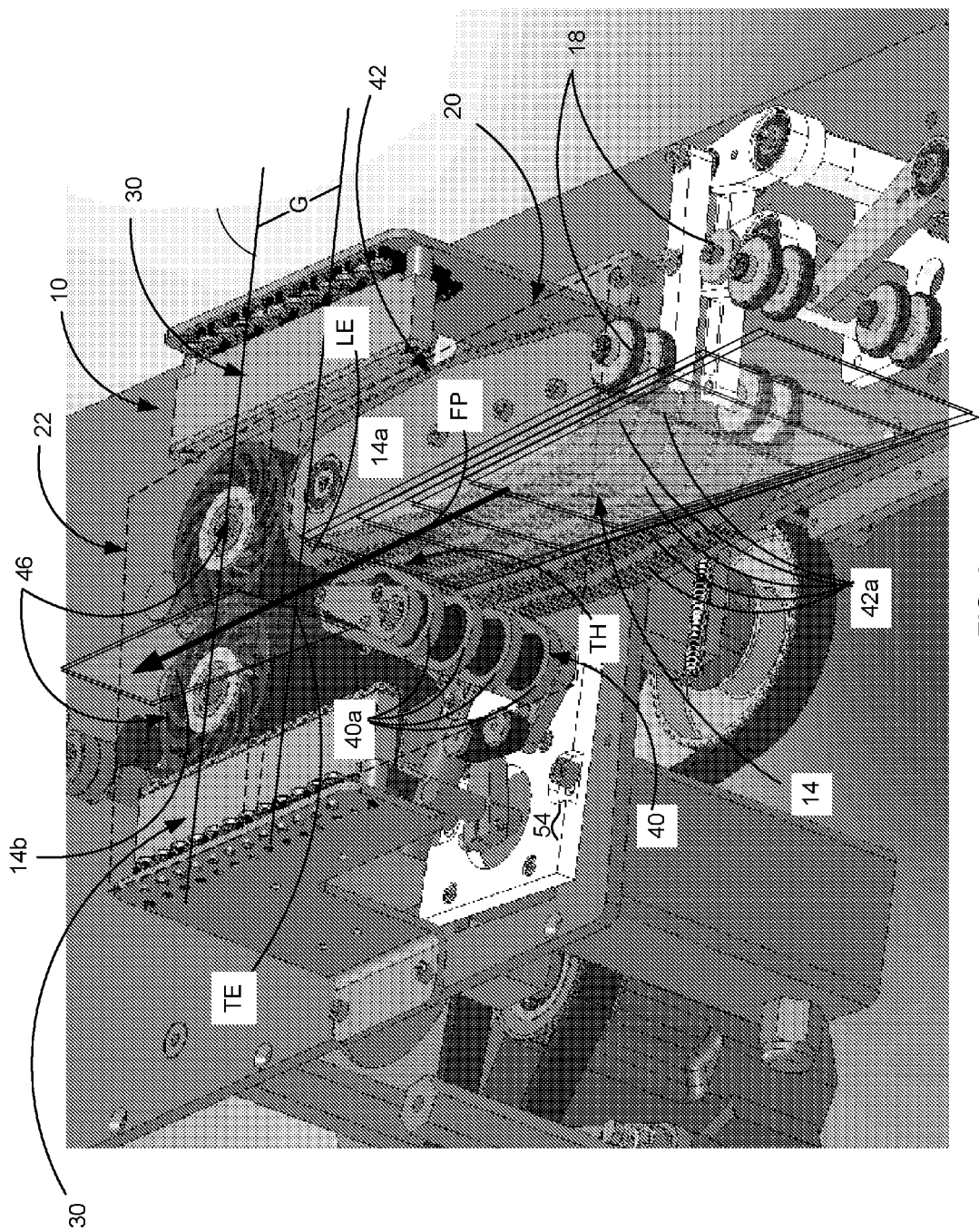
FIG. 2 is a perspective view of the mailpiece according to the present invention depicting a first conveyance operative to singulate a mailpiece from the stack of mailpieces, a second conveyance operative take-away the singulated mailpiece from the first conveyance and the sensor array extending from first to second conveyances.

FIGS. 1 and 2 depict top and perspective views of a system in accordance with the teachings of the present invention. In FIG. 1, the system includes a feed system 10 which includes a transport deck 12 (FIG. 1) for conveying a stack of mailpieces 14 along a feed path FP. The stack of mailpieces 14 is urged toward the feed path FP by vertical separator plates 16 which move the stack along the transport deck 12. When the feed end of the stack 14 is aligned with the feed path FP, i.e., at a right angle relative thereto, one or more feed rollers 18 move several of the mailpieces 14 toward a plurality of conveyance devices, described in greater detail below. That is, the feed rollers 18 move the mailpieces 14, a right angle, toward the desired feed path FP.

The mailpiece feed system 10 functions to control the flow, spacing and throughput of each mailpiece. The mailpiece feed system 10 includes first, second and third conveyances, 20, 22, and 24 respectively, wherein various components or elements thereof are controlled by a processor 26. Only the first and second conveyances 20, 22 are depicted in FIG. 2. To properly identify each of the conveyances 20, 22, 24 and to discuss the various components and function of each, the conveyances 20, 22, 24 are outlined by a dashed lines.

In addition to the conveyances 20, 22, 24, the mailpiece feed system 10 includes a series or array of sensors 30 extending from the first conveyance 20 to the second conveyance 22. The array of sensors 30 can also be seen in a perspective view of the mailpiece feed system 10 shown in FIG. 2 of the drawings. The array of sensors 30 is operative to issue a gap signal to the processor 26 (shown in FIG. 1) which is indicative of the location and relative spacing between sequential mailpieces 14 along the conveyance or feed path FP. In the described embodiment, the array of sensors 30 include a series of twelve optical devices, one on each side of the feed path, which detect differences light intensity as mailpieces move across the sensor array. The sensors 30 function to detect the trailing edge TE of one mailpiece and the leading edge LE of a subsequent mailpiece to detect where, along the feed path, separation has occurred. That is, whether singulation has occurred closer to the first conveyance 20 or proximal to the second conveyance 22.

In the described embodiment, the mailpiece feed system 10 includes twelve optical sensors which are assigned location numbers, or values, ranging from zero 0 through eleven 11, through any number of optical sensors may be employed. In the embodiment shown, the optical sensors, zero 0 through eleven 11, are spaced in increments of about 10 mm, or approximately 0.254 inches apart. This spacing has been deemed to be sufficient to provide the fidelity of control required by the processor 26, i.e., to control the various components of the feed module 10 and, in particular, the first and second conveyances 20, 22. An upstream sensor, or the first sensor 0, senses a gap in mailpieces 14 upstream of, or proximal to, the first conveyance 20 while a downstream sensor 11 is aligned with, or proximal to, the second conveyance 22. In the described embodiment, upstream sensors include optical sensors 0 through 4 while the downstream sensors include optical sensors 5 through 11. The import of the location, alignment and spacing of the array of sensors 30 will become evident when discussing the operation of the feed module 10.

The processor 26 operates to control the flow/delivery of each mailpiece along the feed path FP. The processor 26 receives various inputs from the first and second conveyances 20, 22 including the array of sensors 30 which extend along and between the conveyances 20, 22. In particular, the processor 26 receives the gap signal from the array of sensors 30 to control a rotary actuator RA and a drive motor M1 of the first conveyance 22. Furthermore, the processor 26 uses the same gap signal to control a drive motor M2 of the second conveyance 22. Once again, the import of the algorithms associated with the rotary actuator RA and the various sensors 30 and motors M1, M2 will become evident when discussing the operation of the feed module 10 in greater detail.

Controlling the Singulating Belt

The first conveyance 20 is operative to convey mailpieces along the feed path and includes a singulating belt 40 and drive belt 42. In the described embodiment and referring to FIG. 2, the singulating 40 and drive belts 42 include a plurality of interleaving belts 40a, 42a. More specifically, the singulating belt 40 includes four (4) individual belts 40a which are spaced apart and interleaved with five (5) spaced belts 42a of the drive belt 42. As such, an opposing force may interleave such that a singulated mailpiece 14 may be corrugated, in cross section, between the throat TH of the belts 40a, 42a. Such corrugation improves the edgewise or widthwise stiffness of the mailpiece 14 to enhance singulation of the mailpiece 14.

The second conveyance 22 accepts mailpieces 14 from the first conveyance 22, i.e., from the throat TH defined between the singulating and drive belts 40, 42, and conveys the singulated mailpiece 14 downstream of the first conveyance 20 along the feed path FP. In the described embodiment, a pair of compliant nips 46, fabricated from a spiral-hubbed elastomer material, takes-away or removes the mailpiece 14 from the first conveyance 20. The mailpiece 14 is removed at a speed of about one-hundred and sixty inches/sec (160 in/sec), and, as will be discussed in a subsequent portion of this disclosure, may be varied to ensure proper spacing between singulated mailpieces.

As discussed supra, a series or array of sensors 30 extends from the first to the second conveyance 20, 22, and is operative to issue a gap signal G indicative of the relative spacing between sequential mailpieces 14 along the feed path FP. The array of sensors 30 includes an initial or first sensor zero 0, intermediate sensors, i.e., sensors one through four 1-4, and a plurality of downstream sensors, i.e., sensors greater than five 5. While the sensors can be grouped into three regions, for the purposes of simplifying or distinguishing the location of various sensors, upstream sensors can include the initial or first sensor, i.e., sensor zero 0, in combination with the intermediate sensors, i.e., sensors 1 through 4. Hence, for certain teachings the upstream sensors may be more broadly defined as sensors zero 0 through 4, however the downstream sensors are always defined as including downstream sensors greater than sensor 5. Consequently, the plurality of upstream sensors are those proximal to the first conveyance 20, (see FIGS. 1 and 3) and of the plurality of downstream sensors, are those upstream of, and proximal to, the second conveyance 22.

To better define the location of the sensors of the array 30, it should be understood that the upstream sensors may be viewed as sensors disposed within or along the throat TH of the first conveyance 20, i.e., between the singulating and drive belts 40, 42 thereof. Furthermore, the upstream sensors are disposed upstream of the nip NP of the singulating and drive belts 40, 42. In the context used herein the "nip" is defined as the point wherein singulating and drive belts 40, 42 engage or interleave in a none operating condition. Alternatively, the downstream sensors may be viewed as sensors extending downstream of the nip NP and extending to the second conveyance 22.

When describing the array of sensor 30 in terms of a percentage length along the feed path FP, i.e., between the first and second conveyance 40, 42, the upstream sensors, 0 through 4, extend to about forty percent (45%) of the total sensor array or length thereof. Furthermore, the intermediate sensors, i.e., sensors one 1 through four 4, are disposed between a range of about twelve percent 12% to about forty five percent 45% of the total series or array of sensors 30.

In response to a gap signal G, the processor 26 issues a command signal to the rotary actuator RA of the first conveyance 20. More specifically, the singulating belt 40 is disposed about pair of rolling elements 48 (identified in FIG. 1) which are separated by a structural arm 50. The arm 50 is pivotally mounted to a support structure 54 (see FIG. 2), and is adapted to rotate about a rotational axis A. The processor 26 issues a command signal to the rotary actuator RA to impose a variable force, or torque, to rotate the structural arm 50, and consequently the singulating belts 40 toward the drive belts 42. That is, depending upon the location of the gap signal, i.e., whether it is detected by an upstream sensor or a downstream sensor, the opposing force applied by the singulating belts 40 against or toward the drive belts, or between the belts 40, 42 is varied. This command logic prevents double feeds by the feed module 10.

More specifically, the opposing force applied between the singulating and drive belts 40, 42 decreases when the gap signal G is detected by a downstream sensor, i.e., sensors 5 through 11, relative to a gap signal G detected by an upstream sensor, i.e., sensors 0 through 4. In another embodiment of the invention, the opposing force applied between the singulating and drive belts 40, 42 increases from when the gap signal G is detected further downstream, within the series of upstream sensors. That is, the force incrementally or gradually increases as the gap signal G is detected further upstream within the series of upstream sensors, i.e., sensors zero 0 through four 4.

To better understand the relationship of the force applied between the singulating and drive belts, it is useful to examine Table I depicted below. Table I depicts three columns, a first column indicating the sensor number or location from zero (0) through eleven 11, the second indicating the force applied by the rotary actuator or motor RA, and the third indicating the force applied by the singulating belt 40 against the mailpieces 14 or in the direction of the drive belts 42. With respect to the latter, the increase seen in the forces induced by the rotary actuator (the values shown in Column 2) verses those imposed by the singulating belts 40 (the values shown in Column 3) is due to the moment arm of between the rotational axis of the actuator and the length of the structural arm 50.

TABLE I

| Sensor No. | Actuator/Motor Induced Force | Force Imposed by Singulating Belts (lbs) |
|---|---|---|
| 0 | 1.4 | 1.7 |
| 1 | 2.0 | 2.2 |
| 2 | 2.0 | 2.2 |
| 3 | 2.7 | 3.0 |

TABLE I-continued

| Sensor No. | Actuator/Motor Induced Force | Force Imposed by Singulating Belts (lbs) |
|---|---|---|
| 4 | 2.7 | 3.0 |
| 5 | 1.1 | 1.3 |
| 6 | 1.1 | 1.3 |
| 7 | 1.1 | 1.3 |
| 8 | 1.1 | 1.3 |
| 9 | 1.1 | 1.3 |
| 10 | 1.1 | 1.3 |
| 11 | 1.1 | 1.3 |

From Table I, it will be apparent that the force imposed by the singulating belts 40 increases within the range of the upstream sensors, sensors zero 0 through four 4, from 1.7 lbs to 3.0 lbs, but then decreases to a value of 1.3 lbs when the gap signal is detected within the range of the upstream sensors, i.e., sensors 5 and greater. In fact, the force imposed by the singulating belt 40 is less than any value imposed when the gap signal is detected in an upstream sensor, i.e., 1.3 lbs as compared to 1.7 lbs.

Figure 3:
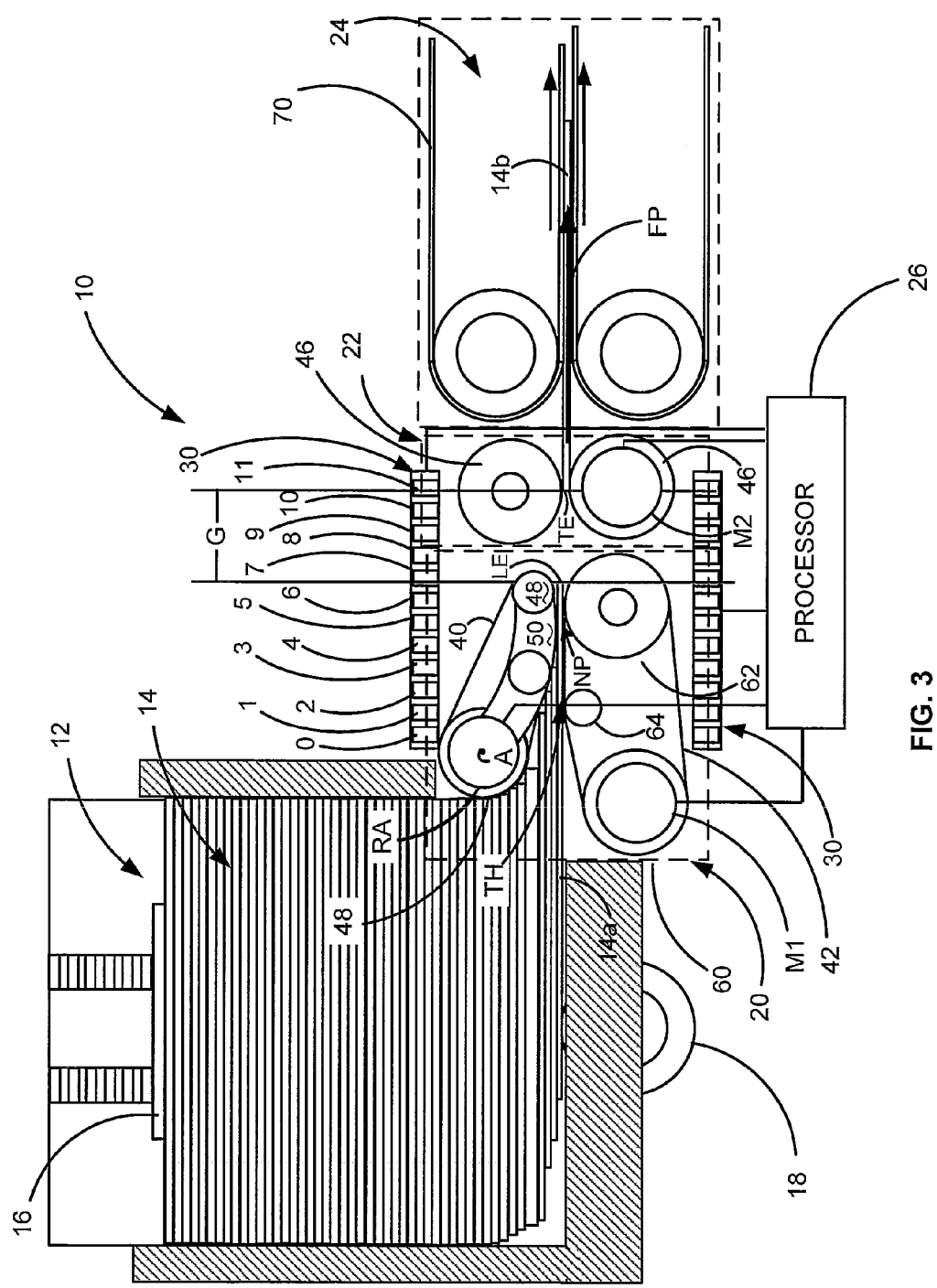
FIG. 3 is a schematic top view of the mailpiece feed system according to the present invention wherein a plurality of singulating belts and the drive belts of the first conveyance is adapted, i.e., controlled, to reliably singulate mailpieces of variable thickness while decreasing the wear of the singulating belts.

Controlling or operating the feed module 10 in accordance with the teachings of the present invention is advantageous in a vary of ways. Firstly, the system is capable of ascertaining when the mailpiece feed system 10 is singulating thick mailpieces as shown in FIG. 1 or singulating thin mailpieces as shown in FIG. 3. Thick mailpieces can be singulated at an upstream location, i.e., when the gap signal is detected by an upstream sensor such as that depicted in FIG. 1. That is, when the leading edge LE is detected by the initial sensor i.e., sensor 0, a first opposing force is applied, e.g., 1.7 lbs (see Table 1). As the mailpieces become thinner or begin to pass further into the array of sensors a greater force value is applied to retard the mailpieces to prevent a double feed. In FIG. 1, the gap signal is detected at sensor two 2, which results in the processor 26 to command a force value of 3.0 lbs to the rotary actuator (see Table 1). When the gap signal is detected further along the array of sensors 30, such as that shown in FIG. 3 where the leading edge is detected at sensor seven 7, an assumption is made that a mailpiece is ready for singulation and the opposing force value is reduced to a lower value of 1.3 lbs (see Table I). If the opposing force value were maintained at a higher level, such as the value imposed when the gap signal is detected at an upstream sensor, e.g., sensor four 4, there is a potential that the singulating belt 40 will pinch adjacent mailpieces at an downstream location and produce a double-feed.

Another advantage to varying the opposing force applied by the singulating belt 40 is reduced wear and maintenance. That is, while prior art feed modules apply a steady or constant force between the belts 40, 42, the variation in opposing force values allows the belts 40, 42 wear at a much slower rate. Consequently, the need to replace the singulation and drive belts 40, 42 is less frequent and the cost of maintenance reduced.

Mailpiece Traction Control

In another embodiment of the invention, the mailpiece feed system 10 may be controlled to improve singulation, i.e., prevent double-feeds, by the imposition of short duration pulses applied by the rotary actuator RA to the mailpieces 14 as they enter the throat TH of the singulating and drive belts 40, 42. More specifically, as mailpieces 14 pass farther downstream into the throat TH of the singulating and drive belts 40, 42, an assumption can be made that the mailpieces 14 are being held together by a high friction coefficient therebetween. or that slippage is occurring between the drive belts 42a and the adjacent mailpiece 14, i.e., the mailpiece currently engaging the drive belts 42a. The pulse serves to momentarily separate the mailpieces to augment the singulation of mailpieces 14 passing through the throat TH of the belts 40a, 42a, In this embodiment, the array or series of sensors 40 is employed to provide information to the processor 26, i.e., by detecting the location of the gap signal G, such that a command signal is issued to the rotary actuator RA to provide a momentary pulse or force into mailpieces 14 entering the throat TH.

While the pulse may be issued with each singulation cycle, i.e., each time a gap signal is detected, the system issues a pulse when the leading edge of the mailpieces 14 being singulated is detected at a downstream sensor location, e.g., when the gap signal G is detected at a sensor location of five (5) or greater. Hence, the pulse is issued or imposed when the gap signal is detected proximal to the nip NP of the singulating and drive belts 40, 42, Alternatively, the pulse is not issued when the gap signal is detected at an upstream location or at a sensor within the throat TH of the singulating and drive belts 40, 42.

In the described embodiment, the pulse is less than about 20 milliseconds in duration, however, the duration of the pulse may be less depending upon the response time of the rotary actuator RA.

Mailpiece Thickness Measurement

Figure 4:
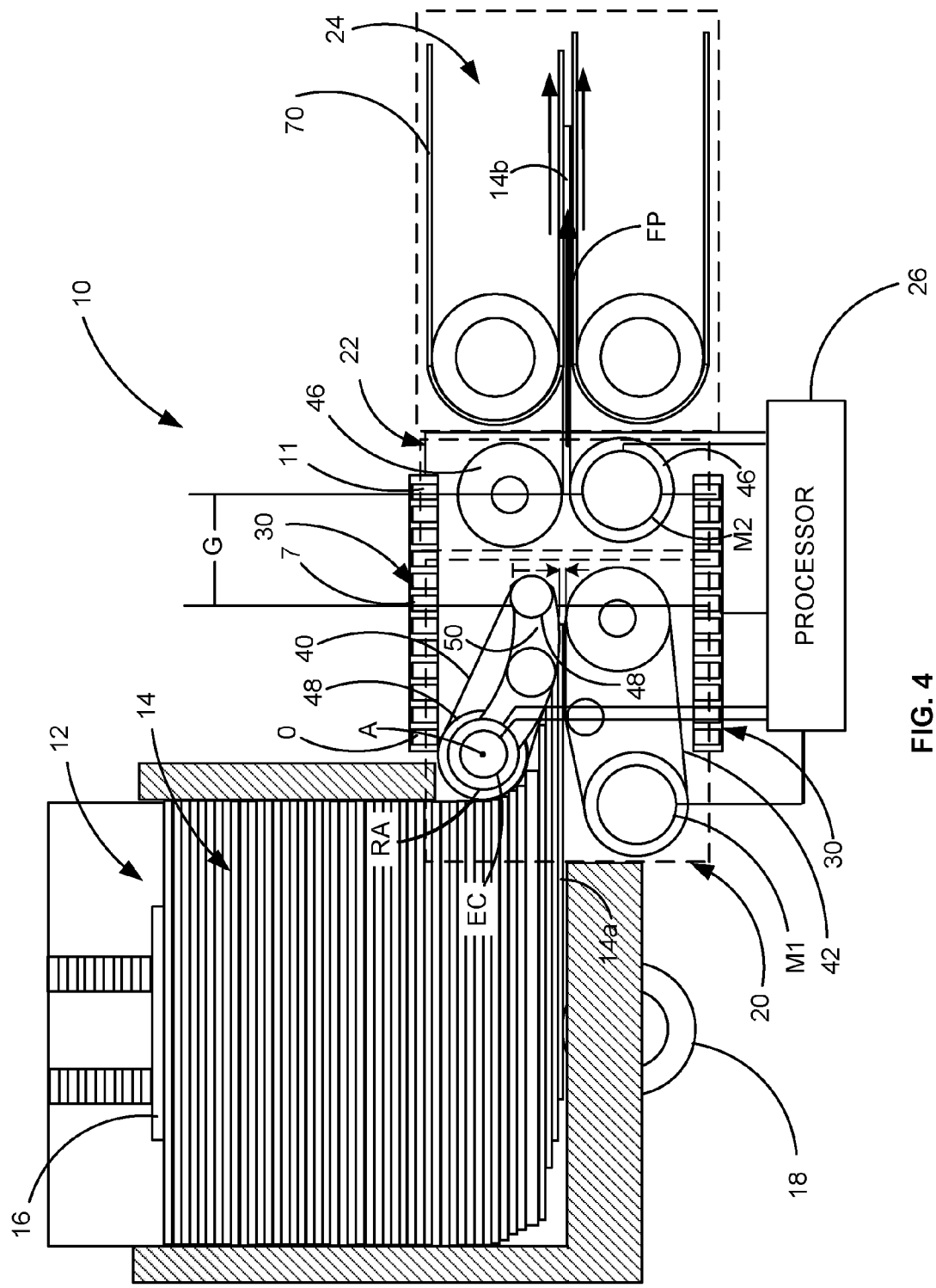
FIG. 4 depicts another embodiment of the invention wherein a rotary encoder is disposed about the rotational axis of the singulating belt assembly to measure the angular position of the singulating belts relative to the drive belts.

In yet another embodiment of the invention shown in FIG. 4, a rotary encoder EN can be disposed about the rotational axis A of the singulating belt assembly, i.e., the singulating belts 40a, rolling elements 50 and structural arm 54, to measure the angular position of the singulating belts 40a relative to the drive belts 42a. The processor 26 receives the angular position signal from the rotary encoder EN. Using the angular position signal, and stored data regarding the separation distance between the singulation and drive belts 40, 42, the system is as capable of determining the thickness T (see FIG. 3) of each mailpiece 14.

While the mailpiece thickness information can be used in a variety of ways, one important use is to calculate the total thickness of mailpieces sorted into containers/bins of the mailpiece sorter. That is, the processor 26 is capable of tracking mailpieces 14 which will be directed to a particular bin, i.e., based upon the scanning of the destination address and ZIP code for delivery. Inasmuch as the capacity or size of each bin is known, measuring the thickness T of each individual mailpiece, and calculate the total thickness of mailpieces directed to a particular bin, enables the processor 26 of the sorter to redirect mailpieces 14 to a buffer station, another bin or an overflow container.

Controlling the Drive Belt

While various benefits are obtained by intelligent control of the singulation belt 40 and the variable opposing force applied based upon the location of the gap signal G, additional benefits or a synergistic effect is obtained by the intelligent control of the drive belt 42 in the mailpiece feed system 10. That is, advantages are also derived by intelligent control of the motor M1 which varies the velocity of the belts 42a depending upon the location of the gap signal G along the feed path, i.e., whether the gap signal is detected by an upstream or downstream sensor.

Inasmuch as the teachings in connection with this embodiment of the invention employ the same or similar components, the same figures, reference numerals, and arrangement of the mailpiece feed system 10 will be used to describe the present invention, In this embodiment, it is useful to appreciate that the drive belt 42 which engages the mailpiece 14 is driven at a higher velocity than the singulating belt 40 such that the end, last or lowermost mailpiece is singulated from the stack of mailpieces. While the belts 42a, 40a move relative to one another, generally the singulating belt 40 is stationary while the drive belt is driven by a motor M1 at one end of a conveyor arrangement. That is, similar to the singulating belts 40a, the drive belts 42a are disposed about at least two rolling elements 60, 62 which are spaced apart to define a friction surface which drives and separates the adjacent mailpiece 14 from the remainder of the mailpiece stack. In the described embodiment, the drive belts 42a are disposed about a third rolling element 64 to effect an angular change in the belts 42a to produce a surface, i.e., a generally planar surface, to produce an efficient friction surface parallel to the mailpieces for singulation.

The essential teaching of this invention relates to varying the velocity of the drive belt 42 based upon the location of the gap signal G along the series of sensors 30. The means for varying the velocity of the drive belt 42 includes receiving a gap signal from the sensors 30, and driving the belt 42 at a first velocity when the gap signal is detected by an upstream location, e.g., sensor zero 0, within the series of sensors 30.

Furthermore, the means for varying the velocity, 30, M1, 42, drives the belt at a second velocity higher than the first velocity, when the gap signal G is detected at a intermediate location downstream of the upstream location. Finally, the means for varying the velocity 30, M1, 42, drives the belt at a third velocity higher than the second velocity, when the gap signal G is detected at a location downstream of the intermediate location.

To better understand the relationship of the variable velocity commanded by the processor 26 to the motor M1 of the drive belts 42a, it is useful to examine Table II depicted below. Table II depicts two columns, a first column indicating the sensor number or location from zero (0) through eleven 11, and the second indicating the acceleration of the drive belts as a function of the gap signal G, or location of the leading edge of the singulated mailpieces 14 along the feed path FP. Of course, it will be appreciated that acceleration is merely a function of a change in velocity, hence terms used herein related to acceleration and velocity are interchangeable. That is, a change in velocity is effected by an acceleration and a change in position is effected by a velocity, or conversely increasing velocity from one location to another is synonymous with a acceleration, i.e., the integration of acceleration is velocity and the integration of velocity is position.

TABLE II

| Sensor No. | Acceleration of Drive or Feed Belts (g's) |
| --- | --- |
| 0 | 18 |
| 1 | 30 |
| 2 | 30 |
| 3 | 30 |
| 4 | 30 |
| 5 | 40 |
| 6 | 40 |
| 7 | 40 |
| 8 | 40 |
| 9 | 40 |
| 10 | 40 |
| 11 | 40 |

From Table II, it will be apparent that the velocity of the drive belts 42 increases as the gap signal G is detected further downstream. For example, when the gap signal is detected at the initial or first sensor of the array of sensors 30, the acceleration commanded by the processor 26 and produced by the motor is 18 g's and results in a first velocity. When the gap signal is detected within the intermediate sensors, within the throat of the singulating and drive belts 40, 42, the acceleration commanded by the processor 26 and produced by the motor is 30 g's, resulting in a second velocity greater than the first velocity. When the gap signal is detected downstream of the upstream sensors, i.e., sensors zero 0 through four 4, which include the intermediate sensors, i.e., sensors one 1 through four 4, the acceleration commanded by the processor 26 and produced by the motor is 40 g's, resulting in a third velocity greater than the first or second velocity.

As mentioned earlier, these control algorithms, in combination with the control algorithms associated with the singulation belts augment the singulation of mailpieces for essentially the same reasons. However, it should be appreciated that either may be used separately or in combination to augment singulation, prevent double feeds and increase throughput.

Conveyance Control

In another embodiment of the invention mailpieces 145 are conveyed along the feed path FP so as to maintain an optimum spacing between mailpieces 14, i.e., between about two (2) to three (3) inches such that downstream devices, i.e., devices which divert mailpieces into the various containers/bins, can reliably operate. In this system, the processor 26 is responsive to the gap signal and operative to control the first conveyance to decrease the relative spacing between sequential mailpieces when the gap signal exceeds a threshold value.

Optimum throughput in a sorter, or any mailpiece handling system, is typically achieved by minimizing the spacing or gap G between mailpieces as they are conveyed along a feed path FF. In the context used herein, the term "gap" refers to the spacing between the trailing edge of one mailpiece and the leading edge of a subsequent mailpiece. While the gap should be minimized to optimize throughput, other systems and components, downstream of an upstream feeder, i.e., a module which feeds and singulates mailpieces from a stack of mailpieces, require that a minimum spacing be maintained to function properly. For example, moveable flaps which divert mailpieces into one of a plurality of sorting containers/bins, require that a spacing of between about two (2) to three (3) inches is provided to allow the diverting flaps ample time to intercept and segregate mailpieces traveling along the rapidly moving feed path.

To ensure that mailpieces of the inventive sorter maintain a threshold spacing, i.e., of between about two (2) to three (3) inches, the speed of the second conveyance 22 or take-away nips is varied. More specifically, the processor 26 uses the information obtained by the array of sensors 30 to increase or decrease the speed of the take-away nips 46. Inasmuch as the speed of the third conveyance 24 or take-away belts 70 is constant, e.g., about 165 inches per second, the array of sensors 30 is capable of measuring the spacing or gap G between mailpieces. Should this spacing be less than the minimum required, e.g., two (2) inches, the speed of the second conveyance 22 can be increased to increase the gap between mailpieces 14. On the other hand, should the spacing be greater that the maximum required, e.g., three (3) the speed of the second conveyance 22 can be decreased to decrease the gap between mailpieces 14. With respect to the latter, decreasing the speed of the second conveyance 22 and decreasing the speed that the mailpiece 14 travels to the third or take-away belts 70, while prevent buckling or distortion of the mailpiece 14 due to the mismatch in input and output speeds of the second and third conveyances 22, 24.

Optimum throughput in a sorter, or any mailpiece handling system, is typically achieved by minimizing the spacing or gap G between mailpieces as they are conveyed along a feed path FF. In the context used herein, the term "gap" refers to the spacing between the trailing edge of one mailpiece and the leading edge of a subsequent mailpiece. While the gap should be minimized to optimize throughput, other systems and components, downstream of an upstream feeder, i.e., a module which feeds and singulates mailpieces from a stack of mailpieces, require that a minimum spacing be maintained to function properly. For example, moveable flaps which divert mailpieces into one of a plurality of sorting containers/bins, require that a spacing of between about two (2) to three (3) inches is provided to allow the diverting flaps ample time to intercept and segregate mailpieces traveling along the rapidly moving feed path.

It is in this manner that the spacing between mailpieces 14 can be maintained such that downstream devices such as diverter flaps can properly intercept and segregate mailpieces into the sortation and diverter bins.

It is to be understood that the present invention is not to be considered as limited to the specific embodiments described above and shown in the accompanying drawings. The illustrations merely show the best mode presently contemplated for carrying out the invention, and which is susceptible to such changes as may be obvious to one skilled in the art. The invention is intended to cover all such variations, modifications and equivalents thereof as may be deemed to be within the scope of the claims appended hereto.

What is claimed is:

1. A system for conveying mailpieces along a feed path, comprising:
   a first conveyance operative to convey mailpieces along the feed path, the first conveyance including a singulating belt and a drive belt, the singulating belt engaging the mailpiece and moving at a velocity higher than the drive belt to singulate the mailpiece from the stack of mailpieces;
   a second conveyance for accepting mailpieces from the first conveyance and conveying the singulated mailpiece downstream of the first conveyance;
   a series of sensors extending from the first to the second conveyance, and operative to issue a gap signal indicative of the location and relative spacing between sequential mailpieces along the feed path;
   a means, responsive to the gap signal, for varying the velocity of the drive belt based upon the location of the gap signal along the series of sensors, and
   a means, responsive to the gap signal, for developing a variable opposing force between the singulating and drive belts based upon the location of the gap signal along the series of sensors.

2. The system according to claim 1 wherein the means for varying the velocity of the drive belt includes driving the drive belt at a first velocity when the gap signal is detected by an upstream sensor within the series of sensors and driving the drive belt at a second velocity when the gap signal is detected at a intermediate location downstream of the upstream location, the second velocity being greater than the first velocity.

3. The system according to claim 2 wherein the means for varying the velocity of the drive belt includes driving the drive belt at a third velocity when the gap signal is detected at a downstream location downstream of the intermediate location downstream of the upstream location, the third velocity being greater than the second velocity.

4. The system according to claim 1 wherein the series of sensors includes:

a plurality of upstream sensors disposed proximal to the first conveyance;

a plurality of downstream sensors, downstream of the upstream sensors, and disposed proximal to the second conveyance; and wherein the variable opposing force developing means decreases the opposing force applied by the singulating belt when the gap signal is detected by a downstream sensor relative to a gap signal detected by an upstream sensor.

5. The system according to claim 4 wherein the plurality of upstream sensors define an upstream sensor and intermediate sensors disposed along the array of sensors, and wherein the opposing force developing means increases the opposing force applied by the singulating belt when the gap signal is detected by one of the intermediate sensors relative to the upstream sensor.

6. The system according to claim 1 wherein the first conveyance includes:

a variable velocity motor driving the drive belt;

wherein the opposing force developing means is operative to apply a variable friction force to vary the relative spacing between sequential mailpieces.

7. The system according to claim 6 wherein the drive and singulating belts include a plurality of belts which alternately interleave such that the belts produce a corrugated force on each of the mailpieces.

* * * * *